United States Patent [19]
Thornell

[11] 3,958,339
[45] May 25, 1976

[54] CUTTING GUIDE

[76] Inventor: Gerard F. Thornell, 29 Albany St., Wollaston, Mass. 02170

[22] Filed: June 23, 1975

[21] Appl. No.: 589,037

[52] U.S. Cl. .................................. 33/185 R; 83/1; 83/522; 144/133 R; 144/134 R
[51] Int. Cl.² ...................... B27G 23/00; B27C 5/00
[58] Field of Search ........ 144/133 R, 136 R, 134 B, 144/114 R, 198 R, 198 A; 83/1, 5, 522; 33/185

[56] References Cited
UNITED STATES PATENTS

| | | | |
|---|---|---|---|
| 3,205,586 | 9/1965 | Mullen | 33/185 R |
| 3,732,906 | 5/1973 | Welgas | 144/133 R |

*Primary Examiner*—Othell M. Simpson
*Assistant Examiner*—W. D. Bray
*Attorney, Agent, or Firm*—Morse, Altman, Oates & Bello

[57] ABSTRACT

A cutting guide for precisely setting radial arm and table saw blades in the fabrication of lapped and dado joints comprises a generally wedge shaped body that is formed with a channel at a medial region and a seat at one end. A guide is provided in the channel midway between an inner edge of the seat and the other end of the body. The dimensional relationship among the inner edge of the seat, the other end of the body and the guide is such that when the seat is placed on a piece of lumber with the inner edge of the seat abutting the edge of the lumber and a saw blade is moved to lightly contact the guide, the saw blade is in position to cut halfway into the lumber for making a lap or dado joint.

10 Claims, 9 Drawing Figures

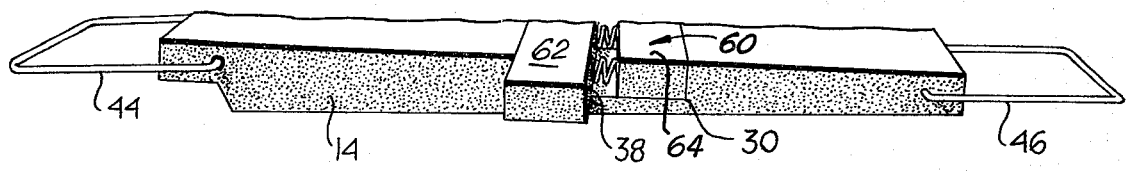
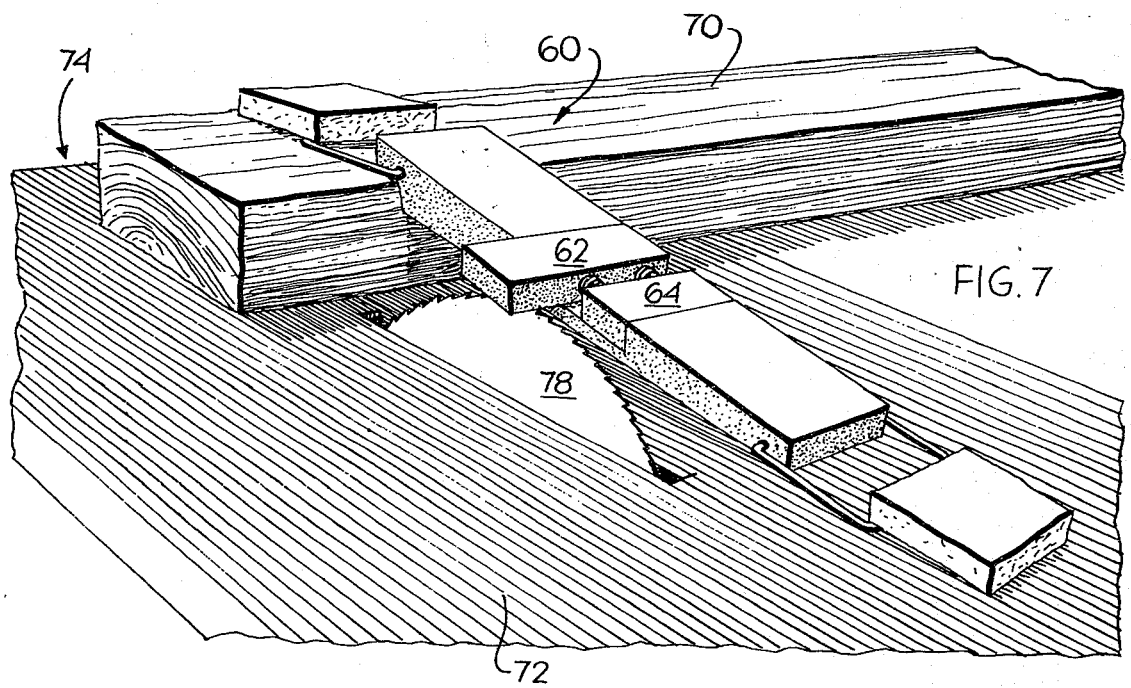
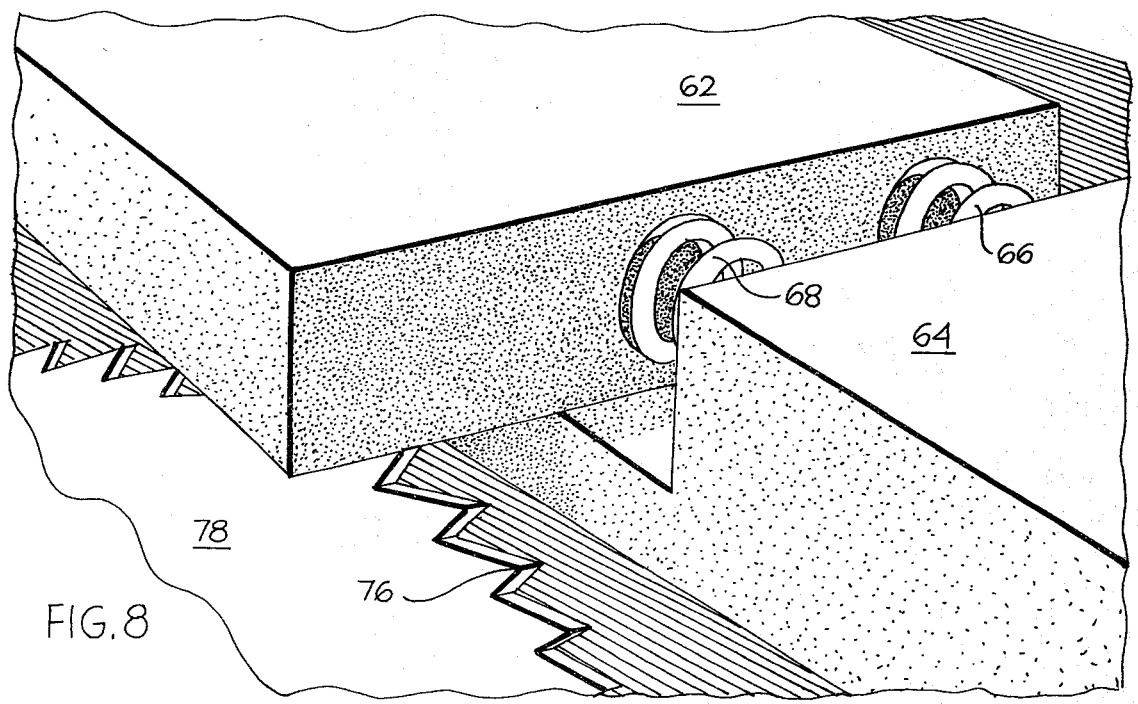

CUTTING GUIDE

BACKGROUND OF THE INVENTION

1. Field of the Invention:

The present invention relates to woodworking and, more particularly, is directed towards a cutting guide for making fitted joints.

2. Description of the Prior Art:

Lapped and dado joints are used for joining two pieces of wood having similar heights so as to provide a smooth surface at the joint. In order to make such joints, it is necessary to precisely cut halfway into each piece of wood. Generally, a scale is used to measure the midline of the wood. Then, the saw is adjusted until the blade is at the midline. This method of measuring and then adjusting the saw blade is prone to errors which result in ridges at the joints. In addition, if pieces of wood of various thicknesses are used, a time consuming measurement must be made before each cut. A need has arisen for a cutting guide that can be used to precisely position a saw blade for making lapped and dado joints.

SUMMARY OF THE INVENTION

It is an object of the present invention to provide a cutting guide for precise alignment of power saw blades in the fabrication of fitted joints, particularly lapped and dado joints made with radial arm and table saws. The cutting guide comprises a generally wedge shaped body that is formed with a channel at a medial region and a seat at one end. A guide is provided in the channel midway between an inner edge of the seat and the opposite end of the body, the guide being located within the channel. The dimensional relationship among the body, the inner edge of the seat, and the guide is such that, when the seat is resting on a piece of lumber with the inner edge of the seat against the edge of the lumber and a saw blade is moved until it just touches the guide, the saw blade is precisely positioned to cut halfway into the height or halfway into the width of the lumber.

Other objects of the present invention will in part be obvious and will in part appear hereinafter.

The invention accordingly comprises the devices, together with their parts, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 5 is a perspective view of the cutting guide of FIG. 1 having an adaptor for use with a table saw;

FIG. 7 is a perspective view of the cutting guide of FIG. 5;

FIG. 8 is a perspective view of the cutting guide of FIG. 7, somewhat enlarged.

DETAILED DESCRIPTION OF THE PREFERRED EMBODIMENTS

Figure 1:
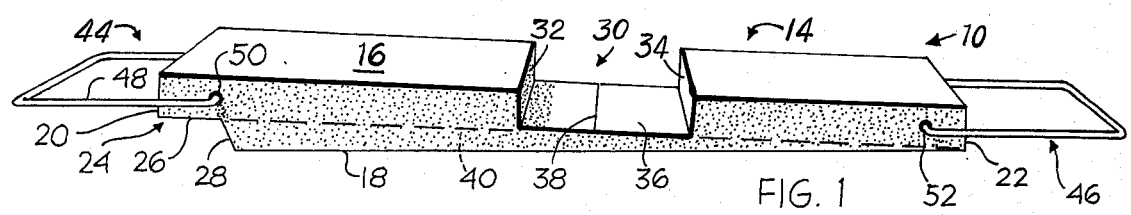
FIG. 1 is a perspective view of a cutting guide embodying the present invention.

Referring now to the drawings, particularly FIG. 1, there is shown a cutting guide 10 for use in the fabrication of fitted joints, for example lapped and dado joints. The cutting guide defines means for setting the position of a cutting blade, particularly a radial arm saw blade, relative to a workpiece, such as a piece of lumber, for example, so that the blade will cut halfway into a given dimension of the lumber. Lapped and dado joints are made by cutting halfway into two pieces of lumber and then joining the cut pieces together. The resulting joint is such that a smooth surface is presented at the union of the two pieces of lumber.

Cutting guide 10 comprises an elongated body 14 having an upper surface 16 and a lower surface 18. Body 14 has a generally wedge shape profile in right cross section, the upper and lower surfaces converging from an end 20 towards an opposite end 22 of body 14. For convenience, end 20 will be referred to as the thick end and end 22 will be referred to as the thin end. Thick end 20 is cutaway at lower surface 18 to form a seat 24 having an upper resting surface 26 and an abutting surface 28. Resting surface 26 lies in a plane that is in spaced parallel relationship with a plane in which upper surface 16 lies. Abutting surface 28 extends from an inner edge of resting surface 26 to lower surface 18, an obtuse angle being formed between the resting surface and the abutting surface. The distance between resting surface 26 and upper surface 16 at thick end 20 is equal to the distance between upper surface 16 and lower surface 18 at thin end 22.

A channel 30 having a generally U-shaped profile is formed at a medial region of body 14, channel 30 being centered somewhat offset from the midline of body 14. As shown in FIG. 1, channel 30 is bounded by a pair of substantially vertical sidewalls 32, 34 and a substantially horizontal floor 36. Resting surface 26 and floor 36 lie in a common plane. A guide 38 is provided midway between the corner formed between resting surface 26 and abutting surface 28 and the corner formed between resting surface surface 18 and thin end 22. Guide 38, for example a line marked on floor 36, is disposed along a path that is perpendicular to the longitudinal axis of body 14. As best shown in FIG. 1, the inside corner formed between resting surface 26 and abutting surface 28; line 38; and the outside corner formed at end 22 of body and lower surface 18 lie in a common plane denoted by dashed line 40.

Body 14 is composed of a synthetic or natural material characterized by rigid properties, for example a high density plastic such as a polyamide resin, a metal such as aluminum or wood such as oak or maple. In one embodiment, body 14 is composed of a polyamide resin and is formed using an extrusion process. In the illustrated embodiment, by way of example, the overall length of body 14 is five and three-eighths inches and the width is one and one-eight inches. The distance between line 38 and the corner formed at the junction of resting surface 26 and abutting surface 28 is two and one-half inches. The distance between line 38 and the corner formed at end 22 and lower surface 18 is two and one-half inches. Although the overall length and width of body 14 may vary, the straight line distance between line 38 and the corner formed at the junction of resting surface 26 and abutting surface 28 is maintained equal to the straight line distance between line 38 and the corner formed at end 22 and lower surface 18. In addition, a line drawn from the corner formed at the junction of resting surface 26 and abutting surface 28 to the corner formed at end 22 and lower surface 18 intersects guide 38. These relationships place guide 38 at the midline of a piece of lumber 42, when cutting guide 10 is utilized for making fitted joints. The uses of cutting guide 10 is best illustrated in FIGS. 2 and 3.

Figure 2:
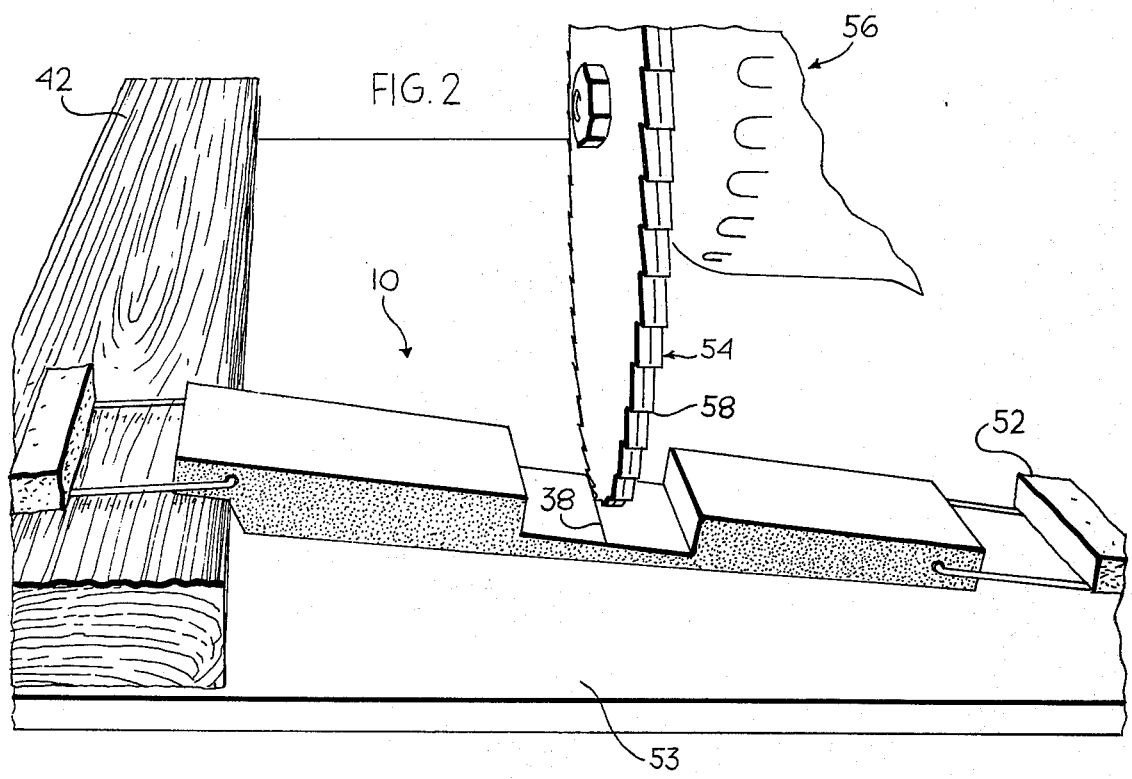
FIG. 2 is a perspective view of the cutting guide of FIG. 1 illustrating certain principles of the invention.
Figure 3:
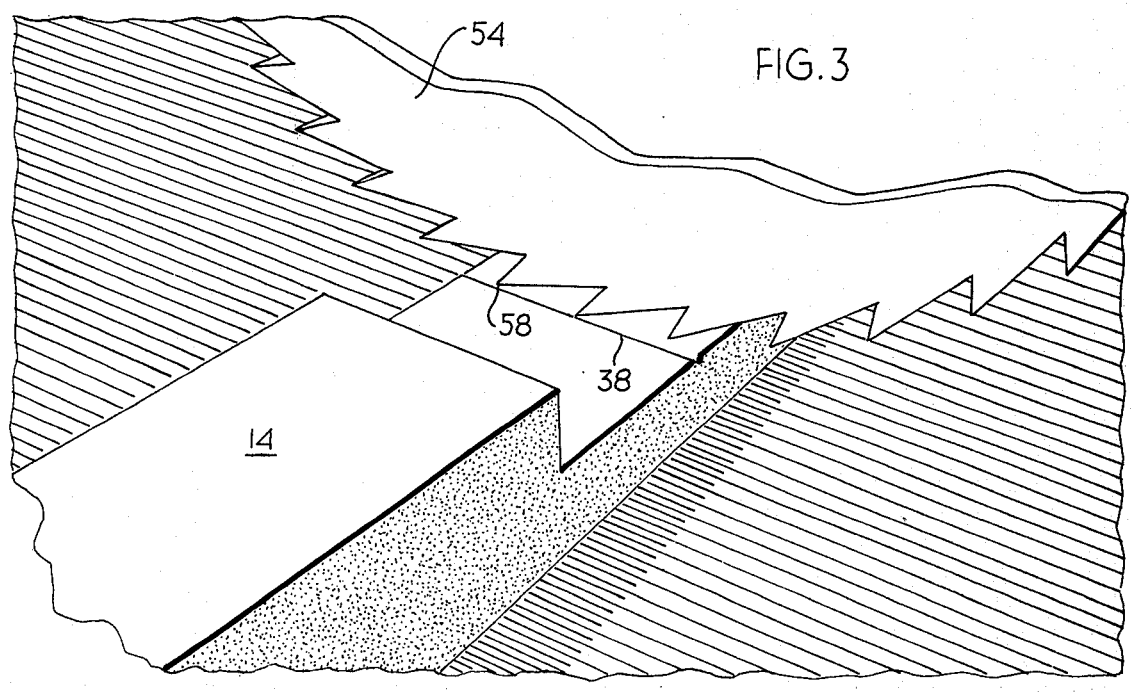
FIG. 3 is a perspective view of the cutting guide of FIG. 2, somewhat enlarged.

As illustrated in FIG. 2, first, lumber 42 is placed on a flat surface 53 adjacent a saw blade 54 of a radial arm saw 56, the longitudinal axis of the lumber being parallel to the blade. Next, resting surface 26 is placed on lumber 42 with abutting surface 28 pressed against the edge of the lumber. Cutting guide 10 is now in the alignment position. A pair of bails or holding members 44 and 46 provided at ends 20 and 22, respectively, of body 14 for maintaining the cutting guide in the alignment position. In the illustrated embodiment, by way of example, holding member 44 is a piece of wire 48 that is formed into a substantially rectangular configuration. The ends of wire 48 are inserted into holes formed in the vicinity of end 20, one of which is shown at 50. Holding member 46 is similar to holding member 44 and is held within holes formed in the vicinity of end 22. As shown in FIG. 2, holding members 44 and 46, which are pivotally mounted in their respective holes and extend beyond the ends of body 14, are operative to hold body 14 in a relatively fixed position by placing a weight 52, for example a block of wood, on the extending portions of the holding members.

Figure 4:
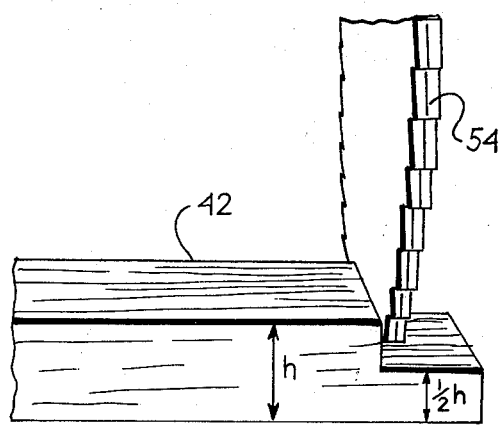
FIG. 4 is a perspective view of a piece of lumber being cut by a radial arm saw for making a lap joint.
Figure 6:
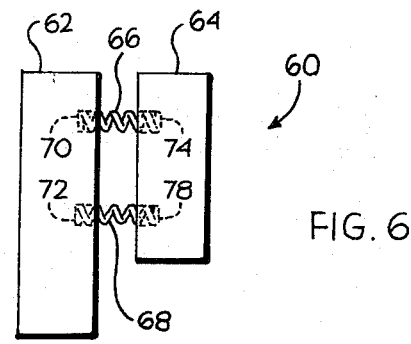
FIG. 6 is a plan view of the adaptor of FIG. 5.

After cutting guide 10 is in the alignment position and held by holding members 44 and 46, saw blade 54 of radial arm saw 56 is moved until teeth 58 of the blade just touch line 38. It has been found that best results are obtained when the power is off and blade 54 is rotated manually. When the tips of teeth 58 just touch line 38, radial arm saw 56 is positioned to cut midway into lumber 42 for making a lap or dado joint. Next, cutting guide 10 is removed and lumber 42 is moved into position for cutting. Radial arm saw is turned on and saw blade 54, which is now rotating, is moved towards lumber 42. As blade 54 contacts lumber 42, one half the height (h) of the lumber is removed as illustrated in FIG. 4. In order to complete a lap joint, for example another piece of lumber having the same height as lumber 42 is cut with the same setting of blade 54. When both pieces of lumber have been cut in the manner hereinbefore described, they are fastened together to form a lap joint. The pieces of lumber may be cemented together or nailed, or cemented and nailed. The foregoing described cutting guide is particularly adapted for use with radial arm saws. In order to facilitate the making of fitted joints with a table saw, it is preferred that cutting guide 10 is provided with an adaptor, one embodiment of which is shown in FIGS. 5, 6 and 7.

Referring now to FIG. 5, it will be seen that cutting guide 10 is provided with an adaptor 60 which is removably seated in channel 30. Adaptor 60 comprises a feeler 62, a block 64 and biasing elements 66, 68, for example springs. Feeler 62 and block 64 are composed of a plastic, for example an acrylic resin, a polyamide resin, methyl methacrylate and the like. Feeler 62 is formed with a pair of holes 70 and 72 which are adapted to receive one end of each spring 66 and 68, respectively. Block 64 is formed with a pair of holes 74 and 76 which are adapted to receive the other end of each spring 66 and 68, respectively. In the illustrated embodiment, each spring is held in its respective holes by means of a suitable cement. In an alternate embodiment, the springs are press fitted into their correlative holes. The length of block 64 is substantially equal to the width of body 14 and the length of feeler 62 is approximately one and one half times greater than the width of body 14. That is, when adaptor 60 is mounted within channel 30, the sidewalls of block 64 are generally flush with the sidewalls of body 14, one sidewall of feeler 62 is generally flush with one sidewall of body 14 and the other sidewall of feeler 62 extends outwardly from the other sidewall of body 14. When adaptor 60 is inserted within channel 30, springs 66 and 68 are compressed. Feeler 62 and block 64 are pressed against sidewalls 32 and 34, respectively of channel 30. The height of feeler 62 and block 64 is such that their upper surfaces are substantially flush with upper surface 16. The width of feeler 62 is such that, when adaptor 60 is positioned within channel 30, the lower interior corner of the feeler is in registration with line 38. The interior lower corner of the extending portion of feeler 62 constitutes an extension of line 38. That is, as shown in FIGS. 7 and 8, the extending portion of feeler 62 is utilized in precisely positioning a table saw blade for cutting midway into a piece of lumber as described in connection with FIGS. 2, 3 and 4.

Referring now to FIGS. 7 and 8, cutting guide 10 having adaptor 60 mounted therein is positioned on a piece of lumber 70 in the manner previously described in connection with FIG. 2, with the exception that the lumber is resting on a table 72 of a table saw 74. The longitudinal axis of lumber 70 is perpendicular to a saw blade 78. After cutting guide is in the alignment position, saw blade 78 is moved, either up or down, until teeth 76 of the blade just touch the interior lower corner edge of the extending portion of feeler 62. It has been found that best results are obtained when power is off and blade 78 is rotated manually. When the tips of teeth 76 just touch feeler 62, table saw 74 is positioned to cut midway into lumber 70 for making a lap or dado joint. Adaptor 60 defines means for extending line 38 for use with a table saw.

Figure 9:
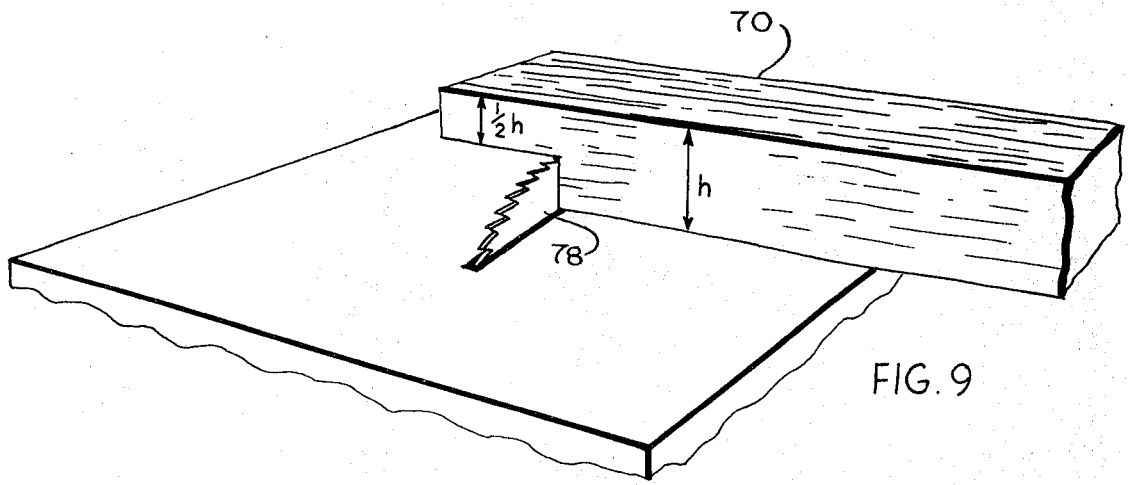
FIG. 9 is a perspective view of a piece of lumber being cut by a table saw for making a lap joint.

Next, cutting guide 10 is removed. Table saw 74 is turned on and lumber 70 is moved towards saw blade 78, which is now rotating. As blade 78 contacts lumber 70, one half the height (h) of the lumber is removed as illustrated in FIG. 9. In order to complete a lap joint, for example, another piece of lumber having the same height as lumber 70 is cut with the same setting of blade 78. When both pieces of lumber have been cut in the manner hereinbefore described, they are fastened together, for example, by nailing or cementing, to form a lap joint.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A device for use with a power saw for positioning a saw blade relative to a workpiece so that the saw blade will cut halfway into a given dimension of the workpiece for making fitted joints, said device comprising an elongated body having an upper surface, a lower surface, a first end and a second end, said lower surface at said first end is cutaway to form a resting surface and an abutting surface, a first corner formed at an intersection of said resting surface and said abutting surface, a second corner formed at an intersection of said second end and said lower surface, said first corner and said second corner disposed in a common plane, and guide means at a medial portion of said body midway between said first and second corners, said guide means disposed in said common plane, whereby said guide means is disposed in a plane that intersects the midline of a given dimension of the workpiece when said resting surface is placed on the workpiece and said abutting surface is pressed against an edge of the workpiece.

2. The device as claimed in claim 1 wherein said upper surface and said lower surface converge from said first end to said second end, said body having a substantially wedge shaped profile.

3. The device as claimed in claim 1 wherein a U-shaped channel is formed at a medial portion of said body, said channel extending downwardly from said upper surface to said common plane.

4. The device as claimed in claim 3 wherein said channel has a floor surface that is coplanar with said common plane, said guide means disposed within said channel.

5. The device as claimed in claim 4 wherein said guide means is a line marked on said floor surface, said line perpendicular to a longitudinal axis of said body.

6. The device as claimed in claim 4 wherein said guide means is an adaptor mounted within said channel, a portion of said adaptor extending outwardly of said body perpendicular to a longitudinal axis of said body.

7. The device as claimed in claim 6 wherein said adaptor includes a feeler, a block, and biasing means, said feeler connected to said block by said biasing means, said adaptor removably mounted within said channel, said biasing means compressed when said adaptor is mounted within said channel for holding said adaptor in said channel, a portion of said feeler extending outwardly of said body, said extending portion of said feeler having a corner that is disposed in said common plane midway between said first corner and said second corner.

8. The device as claimed in claim 1 including a bail connected to one end of said body, said bail defining means for holding said body in a relatively fixed position.

9. A device for use with a power saw for positioning a saw blade relative to a workpiece so that the saw blade will cut halfway into a given dimension of the workpiece for making fitted joints, said device comprising an elongated wedge shaped body having an upper surface, a lower surface, a first end and a second end, said upper and lower surfaces converging from said first end to said second end, said lower surface at said first end is cutaway to form a resting surface and an abutting surface, an inside corner formed at an intersection of said resting surface and said abutting surface, an outside corner formed at an intersection of said second end and said lower surface, said inside and outside corners disposed in a common plane, a channel formed at a medial portion of said body, said channel extending downwardly from said upper surface to said common plane, and a guideline within said channel midway between said inside and outside corners, said guideline disposed perpendicular to a longitudinal axis of said body in said common plane, whereby said guide means is disposed in a plane that intersects the midline of a given dimension of the workpiece when said resting surface is placed on the workpiece and said abutting surface is pressed against an edge of the workpiece.

10. The device as claimed in claim 9 including an adaptor removably mounted within said channel, said adaptor including a feeler that extends outwardly of said body, at least a portion of said feeler in registration with said guideline.

* * * * *